Aug. 30, 1960   J. BOEHM   2,950,624
TRANSMISSION DEVICE
Filed Nov. 3, 1958   2 Sheets-Sheet 1

Josef Boehm,
INVENTOR.

BY
ATTORNEYS.

Aug. 30, 1960     J. BOEHM     2,950,624
TRANSMISSION DEVICE
Filed Nov. 3, 1958     2 Sheets-Sheet 2
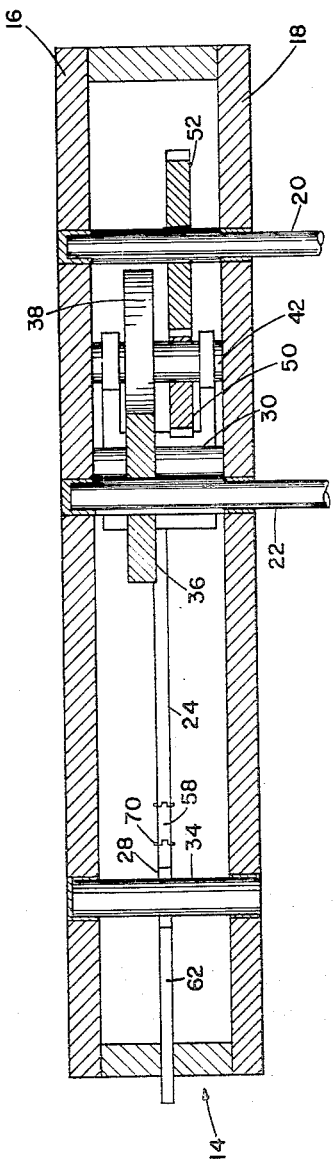
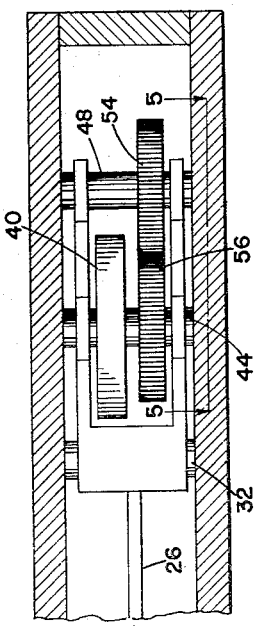
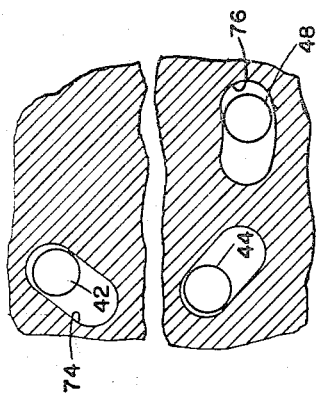
Josef Boehm,
INVENTOR.
BY
ATTORNEYS.

United States Patent Office 2,950,624
Patented Aug. 30, 1960

2,950,624

TRANSMISSION DEVICE

Josef Boehm, 1311 Hermitage Ave., Huntsville, Ala.

Filed Nov. 3, 1958, Ser. No. 771,685

6 Claims. (Cl. 74—202)

(Granted under Title 35, U.S. Code (1952), sec. 266)

The invention described herein may be manufactured and used by or for the Government for governmental purposes without the payment of any royalty thereon.

My invention relates to a device for transmission of power between a pair of shafts having coplanar axes and more particularly to such a transmission device having a low time constant.

High velocity machines such as guided missiles are provided with directive devices with a high degree of flexibility and guidance, and guidance devices that are highly accurate in detecting the deviations of the missiles from predetermined courses. The efficiency of response of the missiles depends upon the speed of translation of the commands of the guidance devices into operation of the directive devices.

It is an object of my invention therefore to provide a transmission device having a low time constant.

Another object of my invention is to provide such a transmission device having a load friction wheel and power friction wheels geared to a power shaft for opposite rotations and disposed for engagement with the load wheel for corresponding rotations thereof.

A further object of my invention is to provide such a transmission device having minimum normal spacing between the friction wheels for independent rotation thereof.

A still further object of my invention is to provide the transmission devices with pivoted levers for supporting the power wheel shafts and a pivoted member for operating the levers to engage the power and load wheels.

Other aims and objects of my invention will appear from the following explanation.

In carrying out my invention a constantly rotating power shaft and a load shaft are journaled in a frame and a pair of levers rotatably disposed on the frame respectively support a pair of friction power wheels geared to the power shaft for opposite rotation thereof.

A member journaled in the frame and respectively secured to the levers is provided with a normal position in which the load and power wheels are separated for independent rotation thereof. The member is pivotable to a pair of positions for respective displacements of the power wheels to engagement with the load wheel for corresponding rotations thereof. The power wheels are disposed for minimum separation from the load wheel in the normal position for minimum value of the displacements, to provide a minimum time constant for the transmission device. The frame includes linear slots to guide the shafts of the load wheels in the displacements.

Toggle joints in the respective connections between the member and the levers provide an engagement force between the power and load wheels for the transmission of power therebetween.

For more complete understanding, reference is directed to the following description and accompanying drawing, in which, Fig. 1 is a partly cut away plan view of a transmission device incorporating my invention disposed in neutral position;

Fig. 3 is a view along line 3—3 of Fig. 1;

Fig. 4 is a view along line 4—4 of Fig. 2; and

Fig. 5 is a view along line 5—5 of Fig. 4.

Figure 2:
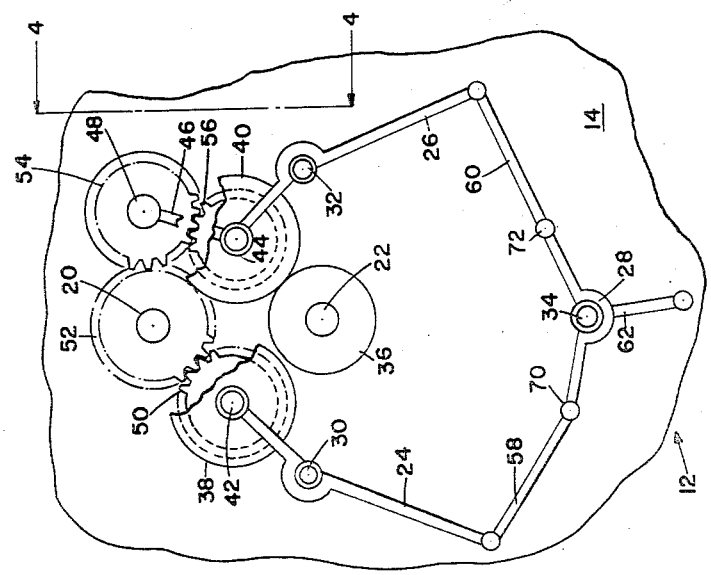
Fig. 2 is a view similar to Fig. 1 with the transmission device in one of the operating positions.
Figure 1:
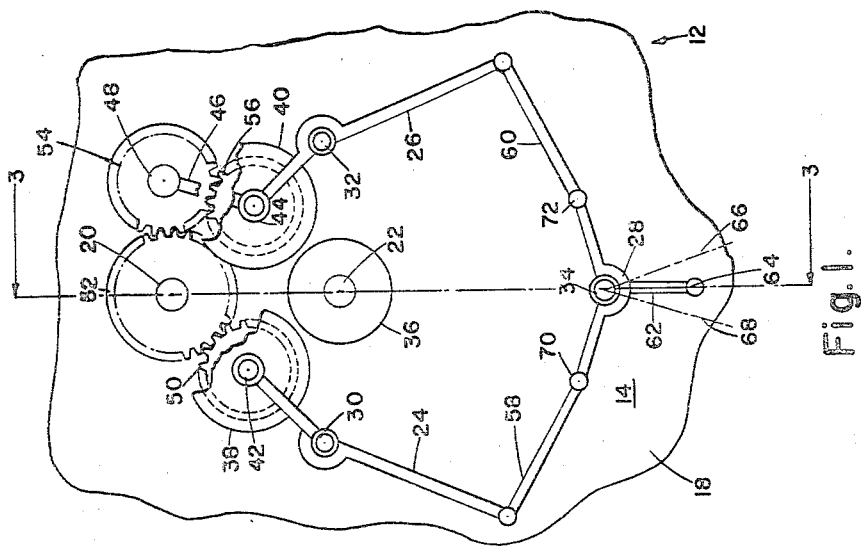

Accordingly, a transmission device 12 is provided with a frame 14 including plates 16 and 18 with power and load shafts 20 and 22 journaled therein. Power shaft 20 rotates constantly.

A pair of levers 24 and 26 and a member 28 are provided with shafts 30, 32 and 34 respectively journaled in the plates and load shaft 22 is provided with a friction wheel 36. A pair of friction wheels 38 and 40 are provided with corresponding shafts 42 and 44 respectively journaled in levers 24 and 26. Wheels 36, 38 and 40 are solidly cylindrical.

A connector 46 is secured to lever 26 and pivoted about the axis of shaft 44 and a shaft 48 is journaled in connector 46. Shafts 20, 22, 30, 32, 42, 44 and 48 are disposed in substantial parallel relation.

Power wheel 38 is provided with a gear 50 meshing with a gear 52 on power shaft 20, and shaft 48 is provided with a gear 54 in meshed relation between gear 52 and a gear 56 secured to power wheel 40 for opposite rotations of power wheels 38 and 40.

Member 28 is connected to levers 24 and 26 by respective links 58 and 60. The member is provided with an arm 62 having a normal position 64 with the wheels spaced for independent rotation and operating positions 66 and 68 for respective external engagement of the load wheel with the power wheels for corresponding rotations of load shaft 22. The wheels customarily are spaced at .001 inch or less in normal position 64 and shafts 30 and 32 are disposed for displacement of wheels 38 and 40 substantially in the line between centers for minimum displacement of the power wheels to engagement with the load wheel in the operating positions, to provide the transmission device with a minimum time constant.

Member 28 and links 68 and 60 are provided with joints 70 and 72 respectively disposed for toggle action when arm 62 is in operating positions 66 and 68 to compress the wheels for transmission of power between the load and power shafts.

Plates 16 and 18 are provided with slots 74 to guide shafts 42 and 44 responsive to the displacements of the power wheels. Since the displacements are small the sides of the guide slots may be straight and the width of the slots may be oversize to compensate for the motion of the shafts without materially affecting the meshing of gears 50 and 52. The variation of center distance between gears 50 and 52 is not enough to affect the mesh therebetween.

A slot 76 disposed in frame 14 includes sides centered in the power shaft 20 axis for guidance of shaft 48 responsive to the displacements.

*Operation*

Arm 62 is disposed in neutral position 64 for independent rotation of wheels 36, 38 and 40 and displaced to operating positions 66 and 68 respectively for selective engagement of wheels 38 and 40 with wheel 36 for respective rotations of shaft 22 in opposite directions. Wheel 38 is directly geared to shaft 20 and wheel 40 is in meshed relation with shaft 20 through gear 54 for the opposite rotations.

Joints 70 and 72 are disposed for toggle operation in the respective operating positions to press wheels 38 and 40 respectively against wheel 36 and transmit power thereto.

I claim:

1. A device for transmission of power between a rotating power shaft; and a load shaft having coplanar axes, comprising: a frame to support the power and load shafts; a wheel secured to the load shaft; a pair of power wheels with integral shafts respectively geared to the power shaft for opposite rotations; a pair of levers journaled in the frame respectively to support the power wheels; and a member secured to the levers and journaled in the frame for rotations to a normal position for independent rotation of said load shaft, and operating positions for opposite rotations thereof; said frame including linear slots to guide the power wheel shafts in the displacements; and said levers being disposed for minimum movement of said power friction wheels between the positions of the independent rotation and of the respective engagements.

2. A device as in claim 1 with a connector secured to one of the levers and pivoted in the axis of the corresponding power wheel; and a stub shaft journaled in said connector and geared to the power shaft and the corresponding power wheel to provide thereto one of the opposite rotations; said frame including slots centered in said power shaft axis to engage said stub shaft for guidance thereof responsive to the displacement.

3. A device as in claim 1 with links disposed between the respective levers and the member for toggle joint operation therewith in the corresponding position to apply pressure between the wheels for deformation thereof in the respective engagements to transmit power therebetween.

4. A device as in claim 1 with said load and power friction wheels provided with bearing surfaces in external relation for the respective engagements, and disposed for substantially uniform unit elemental contact pressure on said bearing surfaces responsive to the engagements.

5. A device for transmission of power between a rotating power shaft; and a load shaft having coplanar axes comprising: a wheel secured to the load shaft; a pair of power wheels with integral shafts; means disposed for geared engagement thereof with the power shaft for opposite rotations of said power wheels and for displacements thereof between a normal position of independent rotation of the load shaft and of minimum spaced relation of said power and load wheels, and positions of respective engagements of said power wheels and said load wheels for opposite rotations of the load shaft, and provided with a pair of linear slots; and a member, and a pair of levers journaled in said frame; said power wheel shafts being journaled in the respective levers; and said member being secured to said levers for the displacement.

6. A device as in claim 5 with said means comprising; a connector secured to one of said levers for pivoted relation about the axis of the power wheel thereof, and a shaft journaled in said connector; said frame including corresponding slots concentric with said power shaft; and said connector shaft being engageable with said slots for meshed relation between the power shaft and the power wheel of said one lever, and said other lever being disposed for meshed relation of the power wheel thereof with the power shaft for the geared engagement.

References Cited in the file of this patent

UNITED STATES PATENTS

| | | |
|---|---|---|
| 112,269 | Merrick | Feb. 28, 1871 |
| 328,556 | Amet | Oct. 20, 1885 |
| 380,467 | Wallace | Apr. 3, 1888 |
| 851,821 | Mease et al. | Apr. 30, 1907 |
| 1,370,899 | Molesworth | Mar. 8, 1921 |